(12) United States Patent
Hecht

(10) Patent No.: US 8,021,088 B2
(45) Date of Patent: Sep. 20, 2011

(54) TOOL WITH RELEASABLY MOUNTED SELF-CLAMPING CUTTING HEAD

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 916 days.

(21) Appl. No.: 12/016,449

(22) Filed: Jan. 18, 2008

(65) Prior Publication Data
US 2008/0193238 A1 Aug. 14, 2008

(30) Foreign Application Priority Data
Feb. 12, 2007 (IL) .......................................... 181295

(51) Int. Cl.
*B23B 51/02* (2006.01)
(52) U.S. Cl. .......... 408/231; 408/226; 408/713; 408/1 R
(58) Field of Classification Search .................. 408/226, 408/144, 227, 230, 231–233, 713
See application file for complete search history.

(56) References Cited

U.S. PATENT DOCUMENTS

| 756,339 | A | | 4/1904 | Down |
|---|---|---|---|---|
| 1,499,584 | A | | 7/1924 | Litchfield |
| 3,304,816 | A | | 2/1967 | Galorneau |
| 5,957,631 | A | | 9/1999 | Hecht |
| 5,988,953 | A | * | 11/1999 | Berglund et al. ............. 408/1 R |
| 6,059,492 | A | | 5/2000 | Hecht |
| 6,109,841 | A | | 8/2000 | Johne |
| 6,276,879 | B1 | | 8/2001 | Hecht |
| 6,485,235 | B1 | | 11/2002 | Mast et al. |
| 6,582,164 | B1 | | 6/2003 | McCormick |
| 6,899,495 | B2 | | 5/2005 | Hansson et al. |
| 7,048,480 | B2 | | 5/2006 | Borschert et al. |
| 7,070,367 | B2 | | 7/2006 | Krenzer |
| 7,101,125 | B2 | | 9/2006 | Borschert et al. |

(Continued)

FOREIGN PATENT DOCUMENTS

DE 10207257 9/2003

(Continued)

OTHER PUBLICATIONS

International Search Report in PCT/IL2008/000120, dated May 29, 2008.

(Continued)

*Primary Examiner* — Daniel W. Howell
*Assistant Examiner* — Paul M Janeski
(74) *Attorney, Agent, or Firm* — Womble Carlyle

(57) ABSTRACT

A metal cutting tool has a cutting head releasably mounted on a front end of a tool shank, in a self-clamping manner. The tool shank's forward end is provided with a pair of shank coupling portions, each having a forwardly facing shank support surface. A pocket recess is defined between the shank's coupling portions. Within the pocket recess are a plurality of shank fixation surfaces which are parallel to a longitudinal axis of the tool shank. The cutting head has a cap portion and a fixation portion extending in rearward direction therefrom. The cap portion includes a pair of head segments, each having a rearwardly facing head base surface. The cutting head's fixation portion has a plurality of head fixation surfaces which are parallel to a longitudinal axis of the cutting head. In the assembled tool, the tool shank's forwardly facing shank support surfaces support the cutting head's rearwardly facing head base surfaces, while the plurality of head fixation surfaces abut the plurality of shank fixation surfaces.

19 Claims, 14 Drawing Sheets

U.S. PATENT DOCUMENTS

| | | | |
|---|---|---|---|
| 7,393,162 B2 * | 7/2008 | Hecht | 408/1 R |
| 7,467,915 B2 * | 12/2008 | de Souza | 408/231 |
| 2005/0260046 A1 | 11/2005 | Hecht et al. | |
| 2006/0093449 A1 | 5/2006 | Hecht et al. | |
| 2009/0311060 A1 | 12/2009 | Frejd | |
| 2010/0143059 A1 | 6/2010 | Hecht | |
| 2010/0266357 A1 * | 10/2010 | Kretzschmann et al. | 408/204 |

FOREIGN PATENT DOCUMENTS

| | | |
|---|---|---|
| JP | 0197512 | 4/1989 |
| JP | 2005169542 | 6/2005 |
| JP | 2006231434 | 9/2006 |
| WO | 84/03241 | 8/1984 |
| WO | 02/090027 | 11/2002 |
| WO | 03/028930 | 4/2003 |
| WO | 03/070408 | 8/2003 |

OTHER PUBLICATIONS

International Search Report mailed May 26, 2008 in PCT/IL2008/000119.

* cited by examiner

TOOL WITH RELEASABLY MOUNTED SELF-CLAMPING CUTTING HEAD

FIELD OF THE INVENTION

The current invention relates to a rotary cutting tool in general and, in one embodiment, to a drill having a releasably mounted cutting head.

BACKGROUND OF THE INVENTION

U.S. Published Patent Application No. 2005/0260046 A1 discloses a cutting tool comprising a cutting head having a cutting head longitudinal axis and tool shank having a shank longitudinal axis. The cutting head includes a cap portion and a fixation portion connected to the cap portion. The cap portion has a pair of head segments, each having a rearwardly facing head base surface, and the fixation portion has one or more sloped head fixation surfaces. The tool shank, at a front end thereof, has a pair of resilient shank coupling portions separated by a pair of shank flutes. The forwardly facing front ends of each shank coupling portion is provided with a shank support surface configured to support a corresponding head base surface. Inner surfaces of the shank coupling portions are provided with one or more shank fixation surfaces sloped with respect to the longitudinal axis of the tool. The sloped shank fixation surfaces are shaped and configured to abut the sloped head fixation surfaces of the cutting head. When the tool is assembled, the shank support surface supports the head base surface and the one or more head fixation surfaces abut the one or more shank fixation surfaces. After a drilling operation, when it is desired to remove the cutting head from the recently-made hole, the bulbous fixation portion prevents the cutting head from slipping out of the shank coupling portion, as the tool is withdrawn from a workpiece.

SUMMARY OF THE INVENTION

In one aspect, the present invention is directed to a metal drill cutting head having a longitudinal axis (L) defining forward and rearward directions as shown in co-pending Israeli application number IL 181296. The inventive metal cutting head includes a cap portion and a fixation portion. The fixation portion is joined to the cap portion and extends in a rearward direction of the cutting head. The cap portion comprises a plurality of head segments separated by at least first and second head flutes, each head segment comprising a rearwardly facing head base surface formed at a rearward end of the cap portion. The fixation portion comprises: a mounting stem connected to the cap portion; a bulge formed on the mounting stem, the bulge comprising a plurality of circumferentially spaced apart protrusions, the protrusions defining a maximum dimension of the fixation portion in a direction perpendicular to the cutting head longitudinal axis; and a plurality of spaced apart head fixation surfaces formed along the fixation portion, each head fixation surface being parallel to the cutting head longitudinal axis.

In another aspect, the present invention is directed to a metal cutting tool comprising a metal cutting head releasably mounted on a forward end of a tool shank, the metal cutting head and the tool shank having a common axis of rotation and a common direction of rotation. The metal cutting head is of the sort summarized above. The tool shank comprises a shank longitudinal axis (S) which is coincident with the common axis of rotation, and a plurality of shank coupling portions, equal in number to the plurality of head segments, formed at the forward end of the tool shank, and a shank pocket recess formed between the shank coupling portions. Each shank coupling portion includes a forwardly facing shank support surface; and an inner surface comprising a plurality shank fixation surfaces, each shank fixation surface being parallel to the shank longitudinal axis. In the assembled metal cutting tool, the rearwardly facing head base surface of each head segment is supported by the forwardly facing shank support surface of a corresponding shank coupling portion, each head fixation surface abuts an opposing shank fixation surface over an abutting region, and the entire bulge is spaced apart from walls of shank pocket recess.

In yet another aspect, the present invention is directed to a method for assembling a metal cutting tool comprising a cutting head having a cap portion and a fixation portion provided with a bulge, and a tool shank having a pair of shank coupling portions defining a shank pocket recess therebetween. The inventive method comprises: axially aligning the cutting head and the tool shank so that cutting head segments and shank flutes are arranged in opposing pairs; urging the cutting head and the tool shank towards each other so that the shank pocket recess receives the fixation portion; and rotating the cutting head relative to the tool shank until head fixation surfaces which are parallel to a longitudinal axis of the cutting head abut shank fixation surfaces which are parallel to a longitudinal axis of the shank, such that the entire bulge is spaced apart from walls of the shank pocket recess; and a head torque transmission wall abuts a shank torque transmission wall.

In still another aspect, the present invention is directed to a metal cutting head having a cutting head longitudinal axis (L) defining forward and rearward directions, the metal cutting head comprising: a cap portion comprising at least one head segment, said at least one head segment comprising a rearwardly facing head base surface formed at a rearward end of the cap portion; and a fixation portion joined to the cap portion and extending in a rearward direction of the cutting head. The fixation portion comprises: a mounting stem connected to the cap portion; a bulge formed on the mounting stem, the bulge comprising at least one circumferentially extending protrusion defining a maximum dimension of the fixation portion in a direction perpendicular to the cutting head longitudinal axis; and a plurality of spaced apart head fixation surfaces formed along the fixation portion, each head fixation surface being parallel to the cutting head longitudinal axis.

In still another aspect, the present invention is directed to a metal cutting tool having a metal cutting head releasably mounted on a forward end of a tool shank, the metal cutting head and the tool shank having a common axis of rotation and a common direction of rotation. The metal cutting head has a cutting head longitudinal axis (L) which is coincident with the common axis of rotation and has at least two head fixation surfaces that comprise a portion of a circular cross section that is perpendicular to the longitudinal axis (L). The tool shank has a shank longitudinal axis (S) which is coincident with the common axis of rotation and has at least two shank fixation surfaces that comprise a portion of an elliptical cross section that is perpendicular to the shank longitudinal axis (S).

In yet another aspect of the present invention the metal cutting head further comprises at least two head flutes and a tool shank further comprises at least two shank flutes;

and in a fully mounted position the head flutes and the shank flutes are generally aligned and there is a gap adjacent the flutes between the head fixation surface and the shank fixation surface

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

The contents of aforementioned U.S. Published Patent Application No. 2005/0260046 A1 are incorporated by reference to the extent necessary to understand the present invention.

Figure 1:
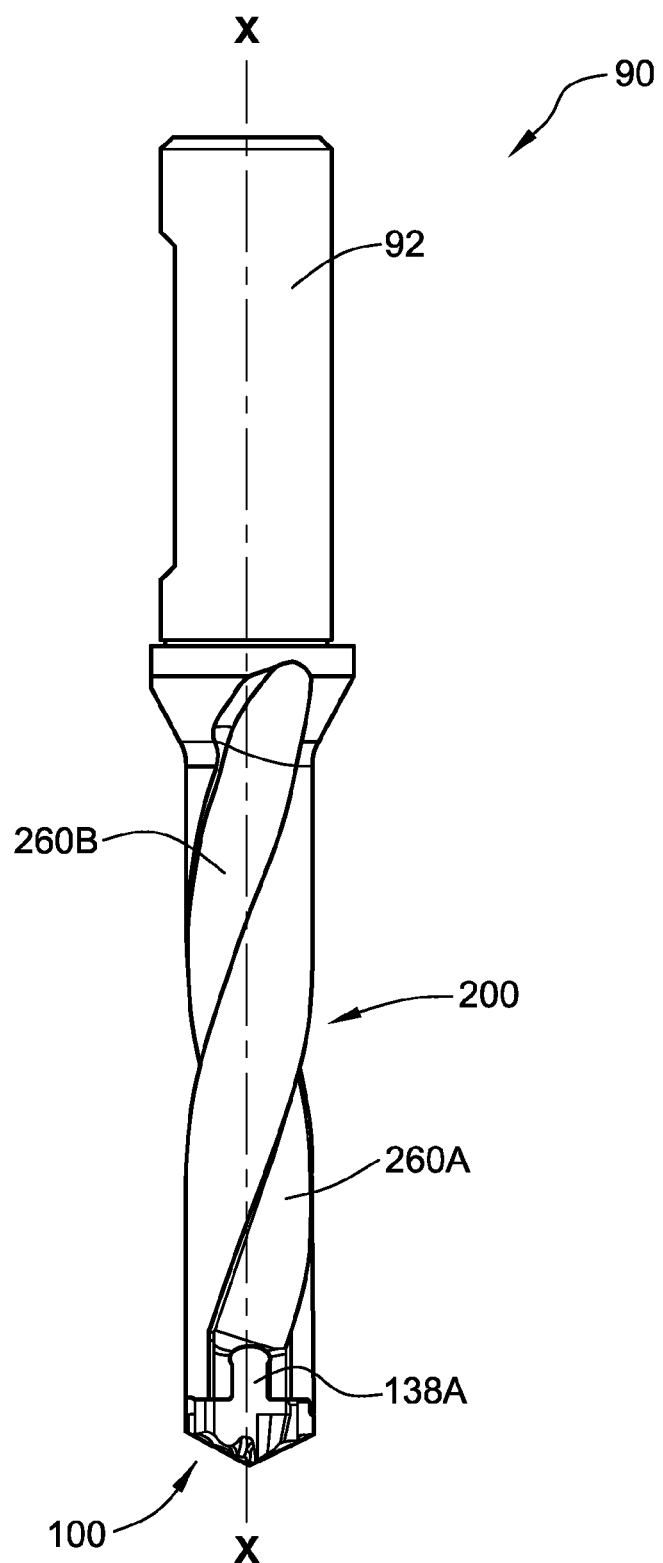
FIG. 1 is view of a tool in accordance with one embodiment of the present invention.

FIG. 1 shows a tool 90 in the form of a drill in accordance with one embodiment of the present invention. The drill 90 includes a cutting head 100 releasably mounted on a shank 200 with the cutting head and the shank having a common longitudinal tool axis X around which the tool rotates. The shank 200 is provided with at least two shank flutes 260A, 260B, each of which connects to a corresponding head flute 138A, 138, respectively, formed on the cutting head 100. In one embodiment, the shank flutes 260A, 260B extend in a generally helical manner along a portion of the common longitudinal tool axis X. The cutting head 100 is typically made of hard wear resistant material such as cemented carbide, and the tool shank 200 is typically made of steel.

With reference to FIGS. 2-5, the cutting head 100 has a cutting head axis L, an operative direction of rotation R, and comprises a cap portion 118 and a fixation portion 120. The cap portion 118 comprises a head top surface 122, a head base surface 124 transverse to the cutting head axis L and a peripheral side surface 126 extending therebetween. The fixation portion 120 protrudes rearwardly from the head base surface 124 away from the head top surface 122. The fixation portion includes a mounting stem 106 connected to the cap portion 118 and directed away therefrom, and a bulge 108 formed on the mounting stem 106. In the embodiment of FIGS. 2-6, the bulge is formed on a lower end of the mounting stem 106. The bulge 108 bulges relative to the mounting stem 106 in a direction generally transverse to the cutting head axis L and in particular in perpendicular to the cutting head axis L.

The bulge 108 has a rounded bottom 109 which merges into at least four circumferentially spaced apart protrusions, including a first pair of protrusions 110A, 110B, located on opposites sides of a first head flute 138A and a second pair of protrusions 110C, 110D (see FIG. 5) located on opposite sides of the second head flute 138B. Alternatively, one may regard one pair of protrusions 110A, 110D as being associated with a first cutting head segment 140A and a second pair of protrusions 110B, 110C as being associated with a second cutting head segment 140B (see FIG. 5). Opposing pairs of the protrusions 110A, 110B, 110C, 110D define a maximum dimension W3 of the fixation portion 120 in a direction perpendicular to the cutting head longitudinal axis L (see FIG. 6).

Figure 3:
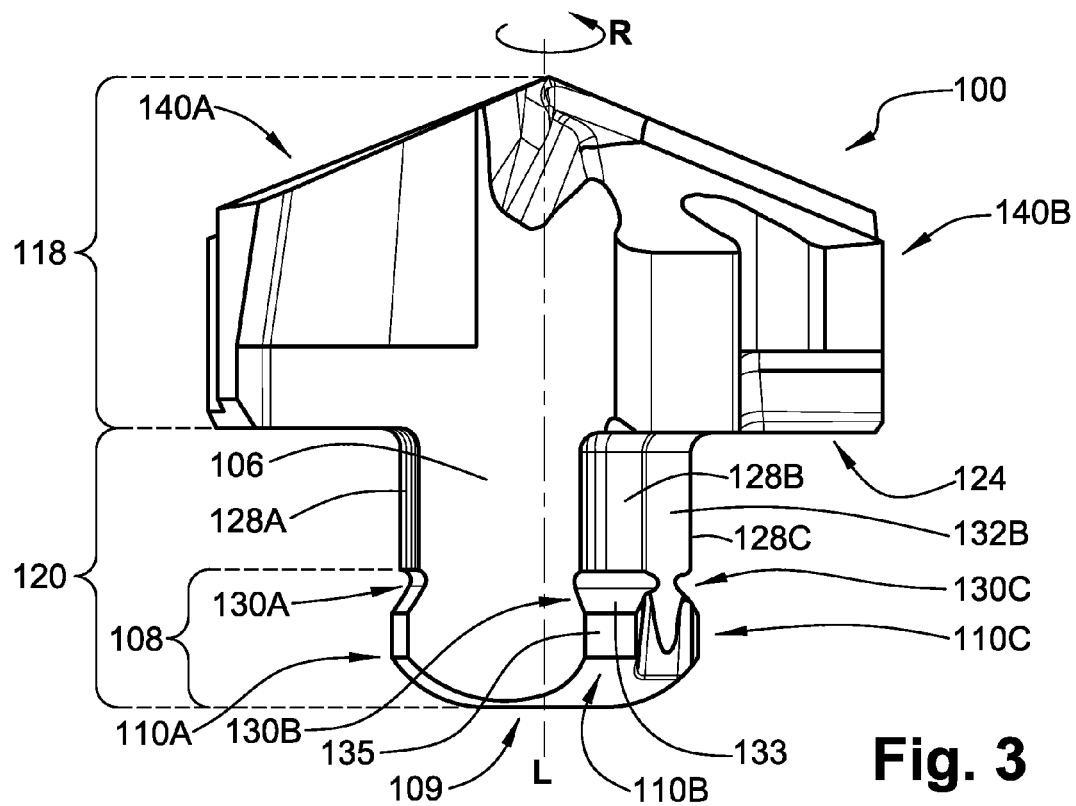
FIG. 3 is a side view of the cutting head shown in FIG. 2.
Figure 6:
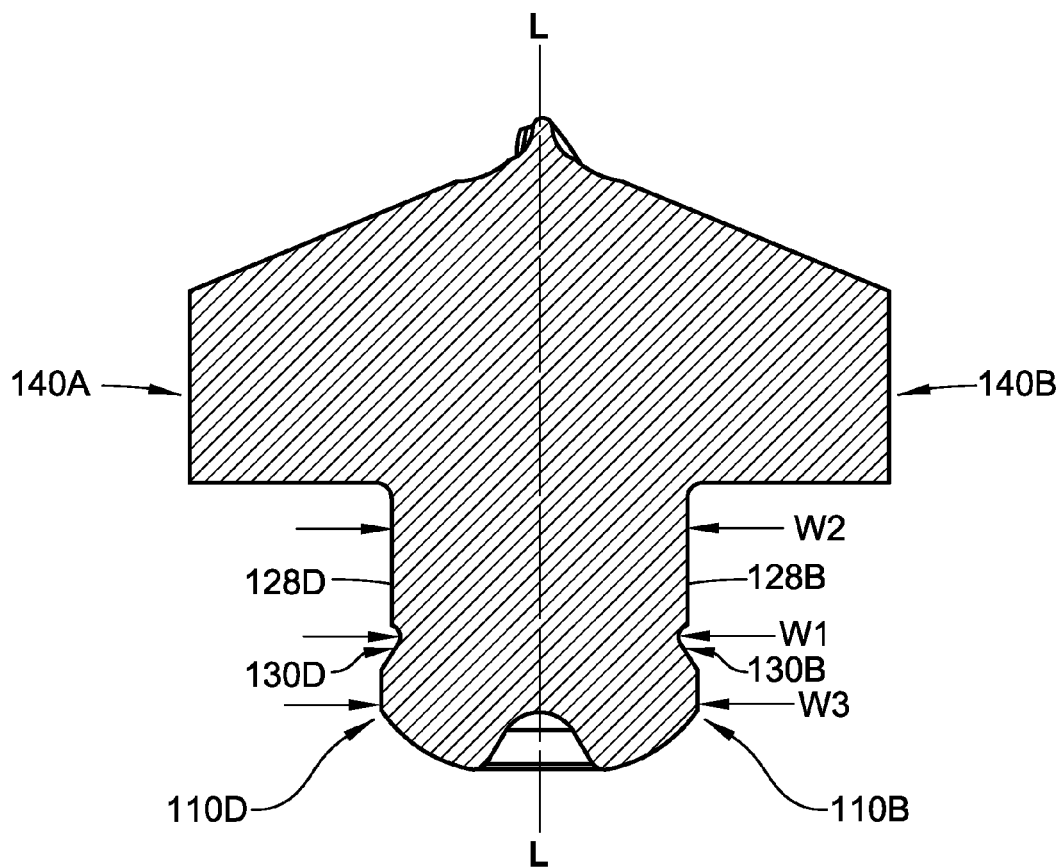
FIG. 6 is a cross-section of the cutting head seen in FIG. 4 taken along lines VI-VI.

At least four head fixation surfaces 128A, 128B, 128C, 128D are formed on the fixation portion. Each head fixation surface 128A, 128B, 128C, 128D is parallel to the cutting head longitudinal axis L. Furthermore, as best seen in FIGS. 3 and 6, one pair of head fixation surfaces 128A, 128D is associated with a first cutting head segment 140A, while a second pair of head fixation surfaces 128B, 128C is associated with a second cutting head segment 140B.

In some embodiments the four head fixation surfaces 128A, 128B, 128C, 128D are formed along the mounting stem 120, each head fixation surface 128A, 128B, 128C, 128D located between a corresponding protrusion 110A, 110B, 110C, 110D, respectively, and the cap portion 118. Given the direction of rotation R of the cutting head 100, head fixation surfaces 128A, 128C may be referred to as the leading head fixation surfaces while head fixation surfaces 128B, 128D may be referred to as the trailing head fixation surfaces. Similarly, protrusions 110A, 110C may be referred to as the leading protrusions while protrusions 110B, 110D may be referred to as the trailing protrusions.

Since each head fixation surface is associated with a corresponding protrusion, a first pair of head fixation surfaces 128A, 128B is separated by the first head flute 138A, while a second pair of head fixation surfaces 128C, 128D is separated by the second head flute 138B. Adjacent head fixation surfaces that are between the first and second head flutes are separated by a head fixation recess 132A, 132B formed in the mounting stem. For instance, head fixation surfaces 128B, 128C are separated by head fixation recess 132A while head fixation surfaces 128A, 128D are separated by head fixation recess 132B. In one embodiment, each head fixation surface has an arcuate shape in a cross-section taken perpendicular to the cutting head longitudinal axis L (see FIG. 11), and thus comprises a portion of a cylindrical shell.

Figure 2:
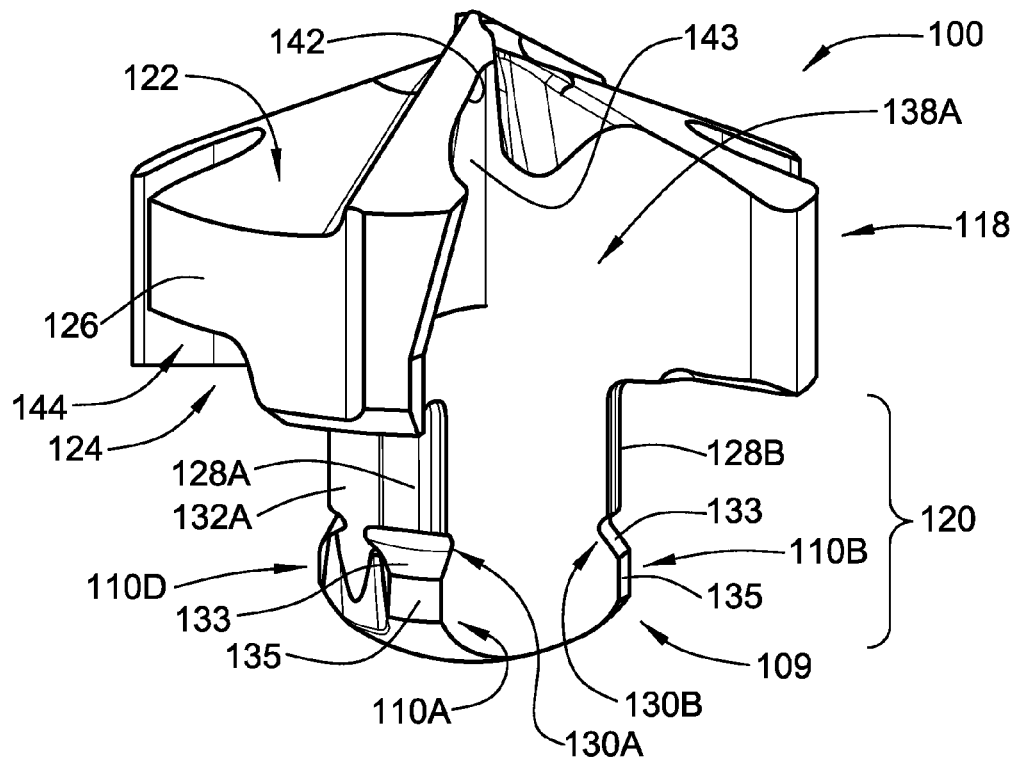
FIG. 2 is a perspective view of a cutting head in accordance with one embodiment of the present invention.

Each head fixation surface is separated from its corresponding protrusion by a notch 130A, 130B. As seen in FIGS. 2 and 3, head fixation surface 128A is separated from protrusion 110A by notch 130A; head fixation surface 128B is separated from protrusion 110B by notch 130B, and head fixation surface 128C is separated from protrusion 110C by notch 130C. As best seen in FIG. 6, each notch has deepest portion that is radially inward of an adjacent head fixation surface.

As seen in FIGS. 2 and 3, in one embodiment, each protrusion (e.g., 110A, 110B) is provided with a beveled protrusion surface 133 which forms an upper surface of the protrusion. The beveled protrusion surface 133 extends from a radially inward position to a radially outward position, in a rearward direction of the cutting head 100. Each protrusion is further provided with a radially outwardly facing protrusion surface 135 which forms a radially outermost surface of the protrusion, and connects to the beveled protrusion surface 133. The radially outwardly facing protrusion surface 135 is parallel to the cutting head longitudinal axis L. As seen in these figures, each beveled protrusion surface 133 forms a lower portion of a corresponding notch.

Figure 4:
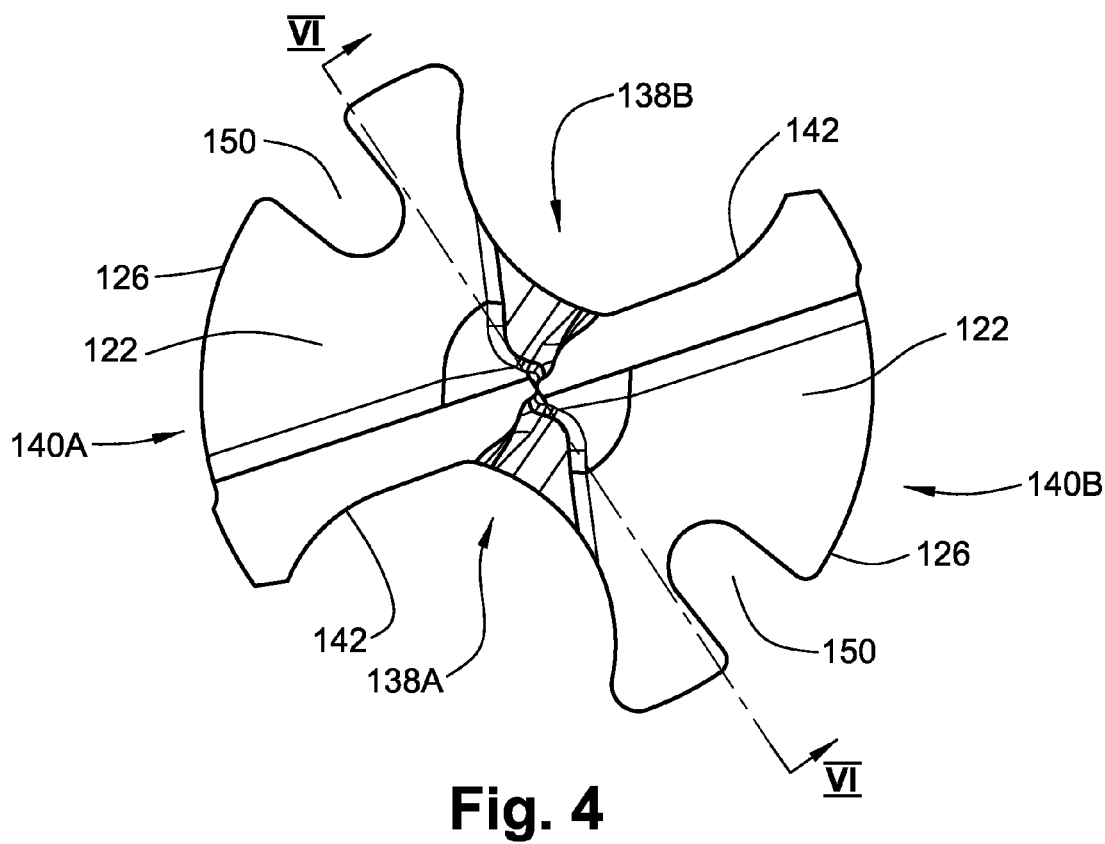
FIG. 4 is a top view of the cutting head shown in FIG. 2.

Two head flutes 138A, 138B extend generally axially rearwardly along a periphery of the cap portion 118 and fixation portion 120, forming two identical head segments 140A, 140B therebetween (FIG. 4). Each head segment 140A, 140B comprises a cutting edge 142 formed along an intersection of an adjacent rake surface 143 with the head surface 122. Each cutting head segment 140A, 140B also comprises a cap recess 144 (FIG. 5) which opens out to the peripheral side surface 126 and to the head base surface 124. The cap recess 144 divides the head base surface 124 into a first component head base surface 146 at a leading end of the cutting head segment 140A, 140B and a second component head base surface 148 at a trailing end of the cutting head segment 140A, 140B.

In some embodiments, a head coolant channel 150 (FIGS. 4 & 5) opens out to the head surface 122, peripheral side surface 126, and second component head base surface 148 and intersects the cap recess 144. A head torque transmission wall 152 adjacent the first component head base surface 146 extends along a portion of the cap recess 144 transverse to the head base surface 124 and generally faces opposite the cutting head direction of rotation R. A cap recess forward surface 154 adjacent the head torque transmission wall 152 is generally parallel to the head base surface 124.

Figure 2A:
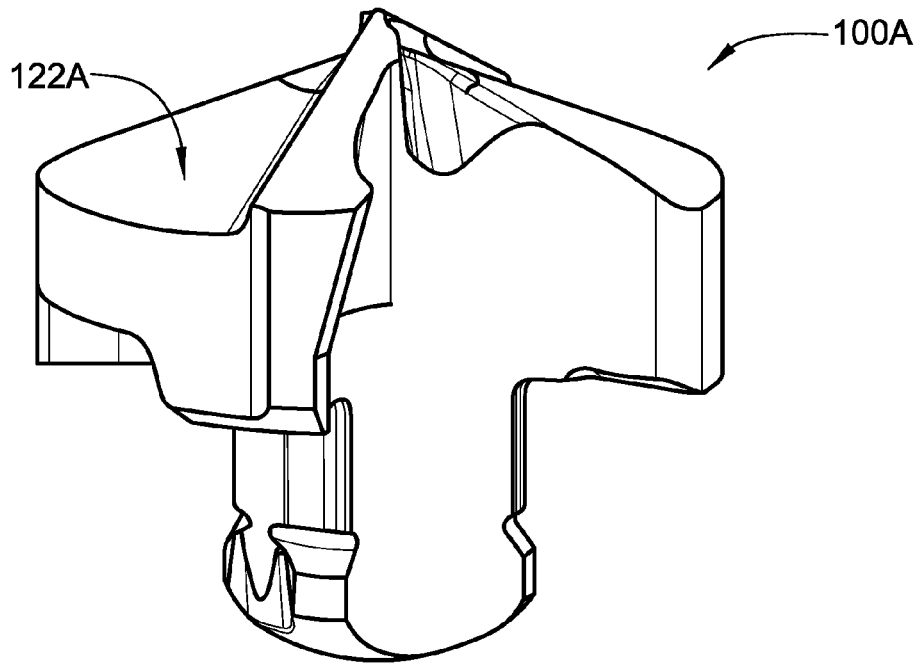
FIG. 2A is a perspective view of a cutting head in accordance with an embodiment of present invention in which no coolant channels are provided.
Figure 4A:
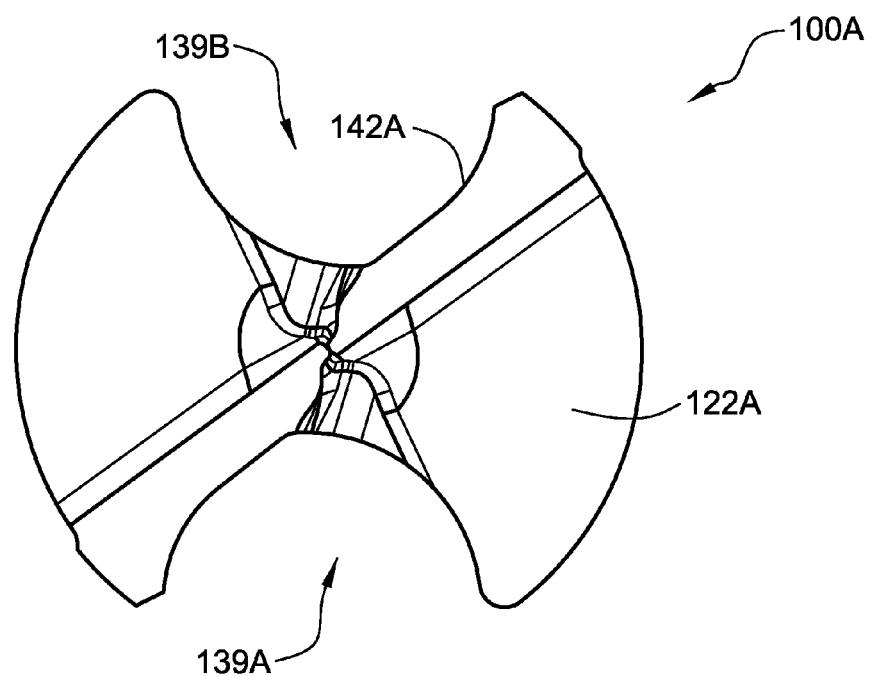
FIG. 4A is a top view of the cutting head shown in FIG. 2A.
Figure 5:
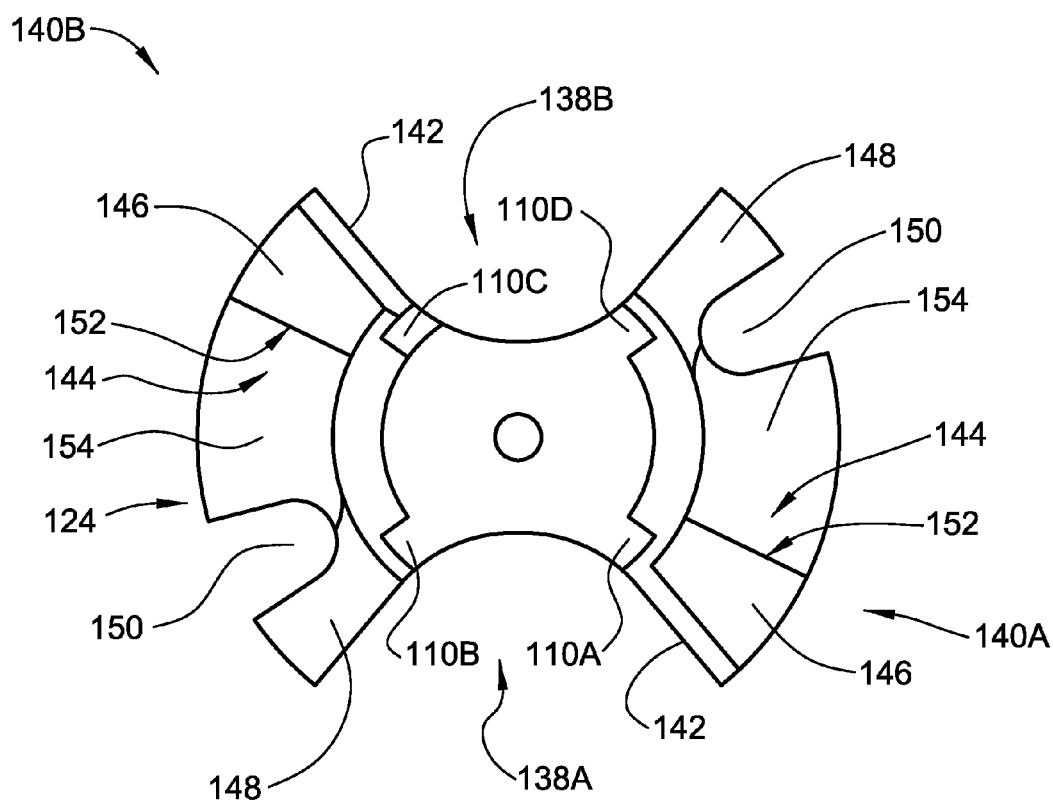
FIG. 5 is a bottom view of the cutting head shown in FIG. 2.
Figure 5A:
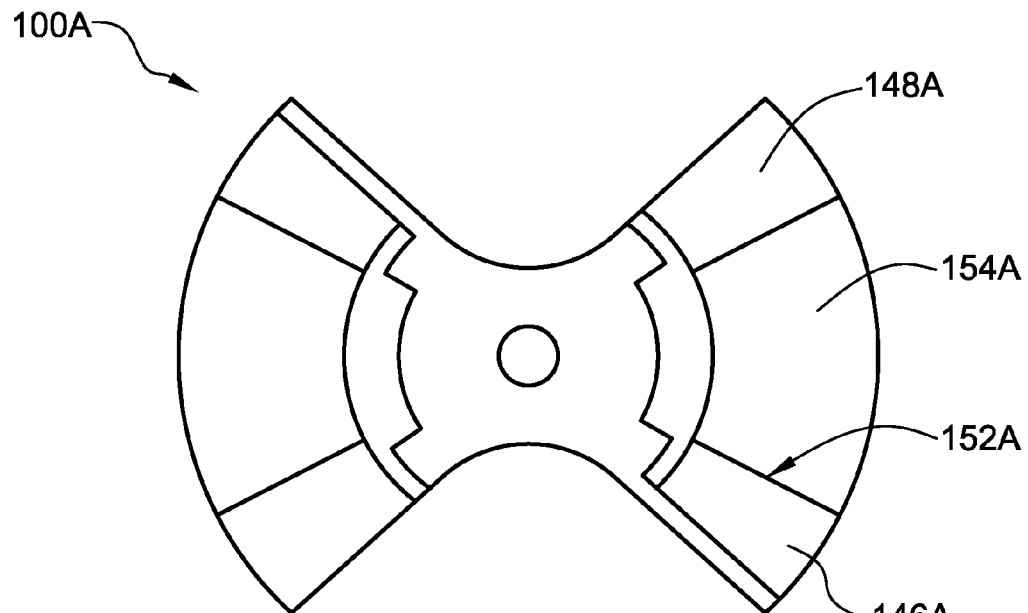
FIG. 5A is a bottom view of the cutting head shown in FIG. 2A.

In the embodiment seen in FIGS. 2A, 4A and 5A, however, cutting head 100A is devoid of coolant channels. In this instance, in a top view of the cutting head 100A, the head surface 122A extends circumferentially in an uninterrupted manner from a first head flute 139A to a cutting edge 142A formed adjacent a second head flute 139B (see FIG. 4A). Similarly, on the underside of the cutting head 100A, the cap recess surface 154A extends circumferentially in an uninterrupted manner from the torque transmission wall 152A adjacent the first component head base surface 146A, to the second component head base surface 148A (see FIG. 5A).

The cross-sectional view of FIG. 6 is taken along a line that passes through the cutting head longitudinal axis L, opposing protrusions 110B, 110D, opposing head fixation surfaces 128B, 128D, and opposing notches 130B, 130D. As seen in FIG. 6, a separation W1 at the deepest portion of the opposing notches is less than a separation W2 of the opposing head fixation surfaces 128B, 128D, which in turn is less than a separation W3 of the opposing protrusions 110B, 110D at the radial surfaces 135, or W1<W2<W3. Therefore, each notch has a deepest portion that is radially inward of an adjacent head fixation surface, and the protrusions define a maximum dimension W3 of the fixation portion in a direction perpendicular to the cutting head longitudinal axis L. In one embodiment, this maximum dimension W3 is found between the radially directed protrusion surfaces 135 of opposing protrusions.

Figure 7:
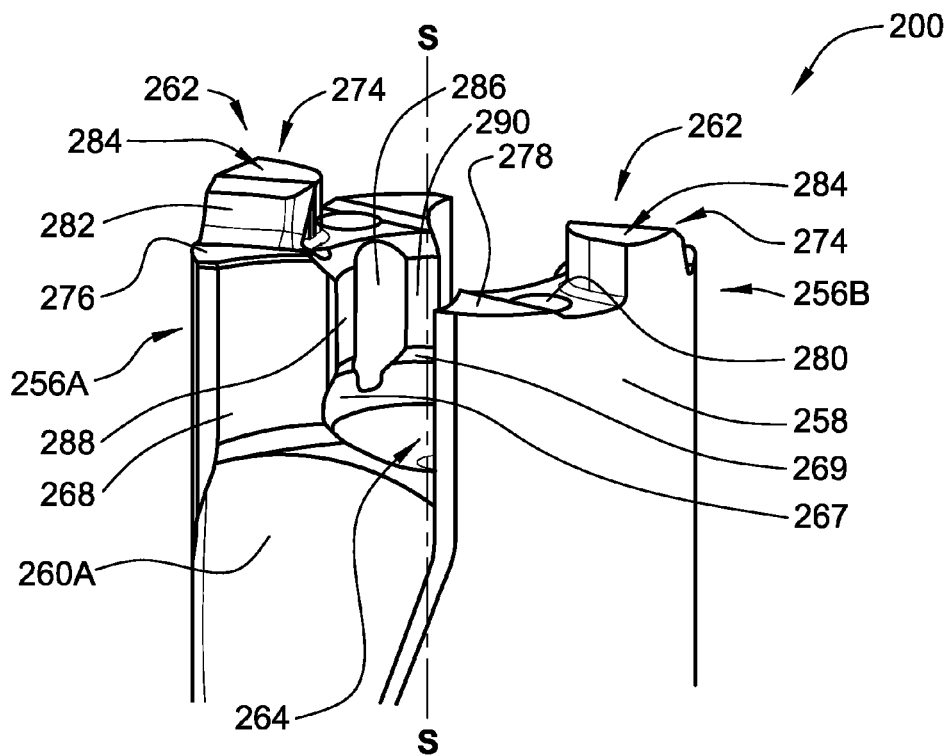
FIG. 7 is a perspective view of the front end of a tool shank in accordance with one embodiment of the present invention.

As seen in FIG. 7, the tool shank 200 has a shank longitudinal axis S. At a forward end thereof, the tool shank 200 has two diametrically disposed shank coupling portions 256A, 256B each peripherally bound by a shank peripheral surface 258 and two shank flutes 260A, 260B. Each shank coupling portion 256A, 256B has a forwardly facing shank support surface 262 extending from the shank peripheral surface 258 generally transversely inwardly to a shank pocket recess 264 formed between the shank coupling portions 256A, 256B.

Figure 8:
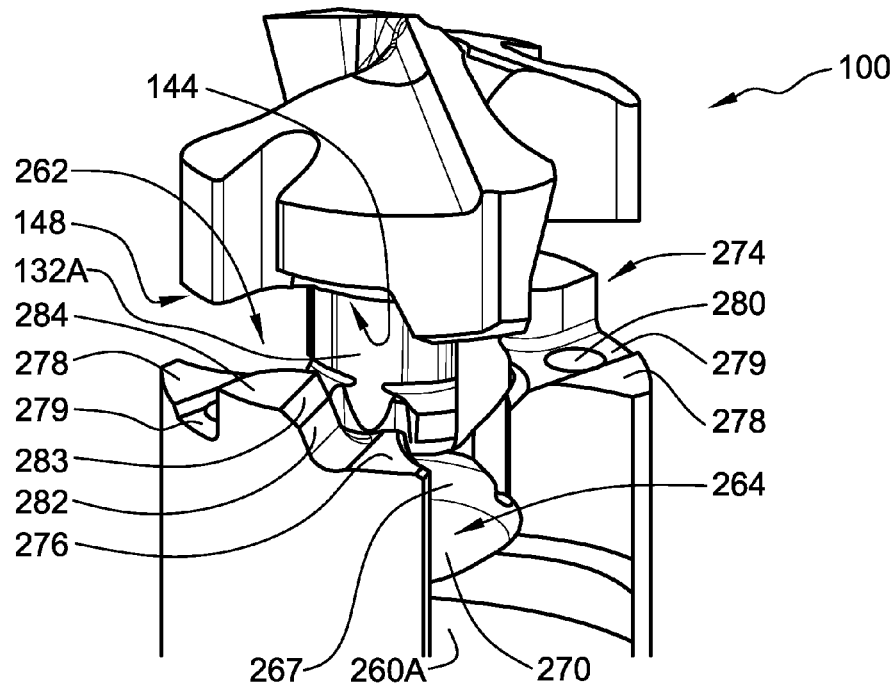
FIG. 8 is a partially exploded view of the cutting head of FIG. 2 and the tool shank of FIG. 7.

Within the shank pocket recess 264 is a concave rear recess surface 270 (see FIG. 8). At the base of an inner surface of each shank coupling portion 256A, 256B, the concave rear recess surface 270 connects at its outer edges to an arcuate recess relief wall 267. The recess relief wall 267, in turn, connects to a rearwardly facing recess retaining surface 269. The inner surface of each shank coupling portion 256A, 256B further comprises a leading shank fixation surface 288 and a trailing shank fixation surface 290, the two shank fixation surfaces 288, 290 being separated by a vertically extending shank fixation recess 286 which communicates with the recess relief wall 267.

Each shank fixation surface 288, 290 is parallel to the shank longitudinal axis S. In one embodiment, each shank fixation surface 288, 290 has an extent along the shank longitudinal axis S that is greater than an extent in a direction transverse to the shank longitudinal axis S. Thus, in one embodiment, each shank fixation surface 288, 290 forms a rectangular surface. In some embodiments, each shank fixation surface 288, 290 has an arcuate shape in a cross-section taken perpendicular to the shank longitudinal axis S (see FIG. 11), and thus comprises a portion of a cylindrical shell. The shape of the shank pocket recess 264 is such that a narrow neck region is formed in each shank coupling portion 256A, 256B adjacent the join between the shank fixation surface 288, 290 and the rear recess surface 270. The narrow neck region makes the shank coupling portions 256A, 256B resiliently displaceable.

A protuberance 274 protrudes forwardly from each shank support surface 262 and a depression 279 is formed in each shank support surface 262 at a trailing end of the protuberance 274. The protuberance 274 and the depression 279 divide the shank support surface 262 into a first, leading component shank support surface 276 at a leading end and a second, trailing component shank support surface 278 at a trailing end thereof.

In some embodiments, the shank has at least two shank coolant channels 280, with at least one shank coolant channel 280 emerging from each shank coupling portion 256A, 256B. Each shank coolant channel 280 opens out into a surface of the depression 279 where it can communicate with the head coolant channel 150. In one embodiment, the shank coolant channel 280 opens out at a point between the first and second component shank support surfaces 276, 278, and more specifically, between the protuberance 274 and the second component shank support surface 278.

Figure 7A:
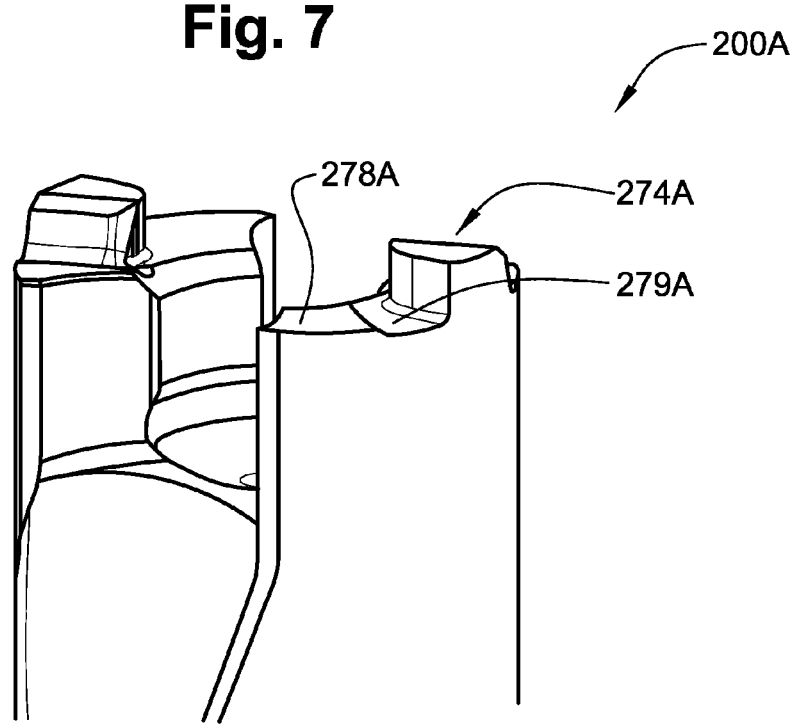
FIG. 7A is a perspective view of the front end of a tool shank in accordance with an embodiment of present invention in which no coolant channels are provided.

In the embodiment seen in FIG. 7A, however, the tool shank 200A is devoid of coolant channels. In this instance, a slight depression 279A may still be present between the second component shank support surface 278A and the protuberance 274A (see FIG. 7). This slight depression 279A can facilitate mounting the cutting head 100A onto the shank 200A, as discussed further below.

A shank torque transmission wall 282 adjacent the first component shank support surface 276 extends along a portion of the protuberance 274. The shank torque transmission wall 282 is transverse to the shank support surface 262 and generally faces the direction of rotation. A protuberance forward surface 284 merges with the shank torque transmission wall 282 via a beveled transition surface 283, and is generally parallel to the shank support surface 262. A shank fixation recess 286 separates the first, leading shank fixation surface 288 formed at a leading end of the shank coupling portion 256A, 256B from the second, trailing shank fixation surface 290 formed at a trailing end of the shank coupling portion 256A, 256B.

With reference to FIG. 8, in order to mount the cutting head 100 on the tool shank 200, the cutting head 100 and tool shank 200 are axially aligned so that the cutting head segments 140A, 140B and shank coupling portions 256A, 256B are arranged in opposing pairs. For each pair, the cap recess 144 is principally above a portion of the protuberance 274, the head fixation recess 132A, 132B is above the first shank fixation surface 288, the second protrusion 128B, 128D is above the shank fixation recess 286, and the second component head base surface 148 is above the depression 279.

Figure 9:
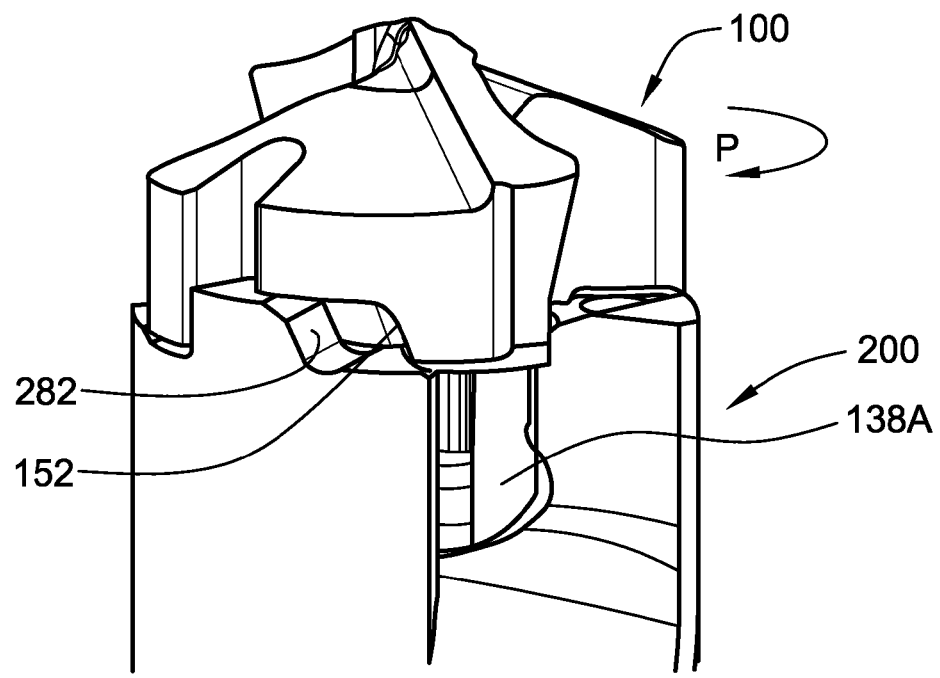
FIG. 9 is a view of the cutting head of FIG. 2 almost fully mounted in the tool shank of FIG. 7.

With reference to FIG. 9, the cutting head 100 and tool shank 200 are then urged towards each other so that the cap recess 144 at least partially receives the protuberance 274, the head fixation recess 132A, 132B opposes the first shank fixation surface 288, the second protrusion 128B, 128D is inserted into the shank fixation recess 286, and the second component head base surface 148 is received into the depression 279.

Finally, the cutting head 100 is brought into a fully mounted position (FIG. 10) by rotating it in the direction indicated by rotational arrow P (FIG. 9) relative to the tool shank 200 until the head and shank torque transmission walls 152, 282 abut. As the cutting head 100 is rotated relative to the tool shank 200, the second component head base surface 148 moves out of the depression 279 and onto the second component shank support surface 278.

Figure 8A:
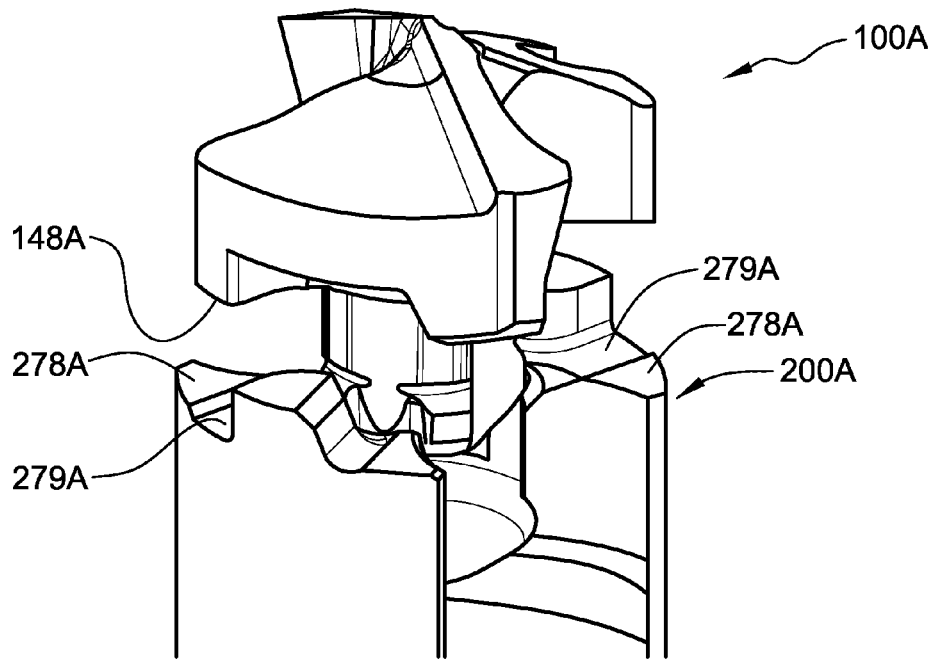
FIG. 8A is a partially exploded view of the cutting head of FIG. 2A and the tool shank of FIG. 7A.
Figure 9A:
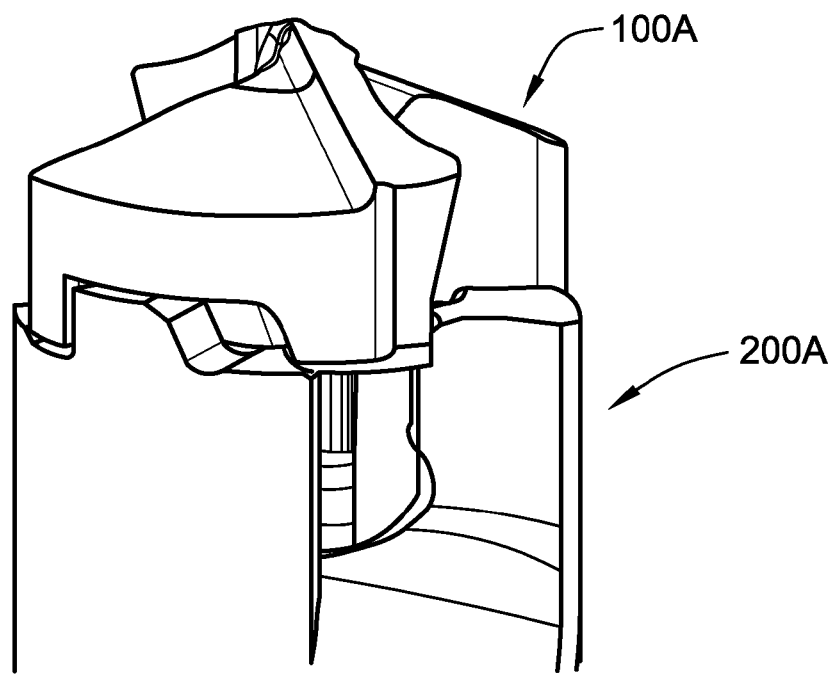
FIG. 9A is a view of the cutting head of FIG. 2A almost fully mounted in the tool shank of FIG. 7A.

As the cutting head is rotated, the head coolant channel 150 becomes aligned with the shank coolant channel 280, thereby permitting coolant flow through the shank and cutting head during operation. However, as seen in FIGS. 8A and 9A, even when the coolant channels are absent, the second component head base surface 148A still initially starts above the depression 279A, and then again enters the depression 279A. Also, as the cutting head 110A is rotated, the second component head base surface 148A moves out of the depression 279A and onto the second component shank support surface 278A.

Figure 11:
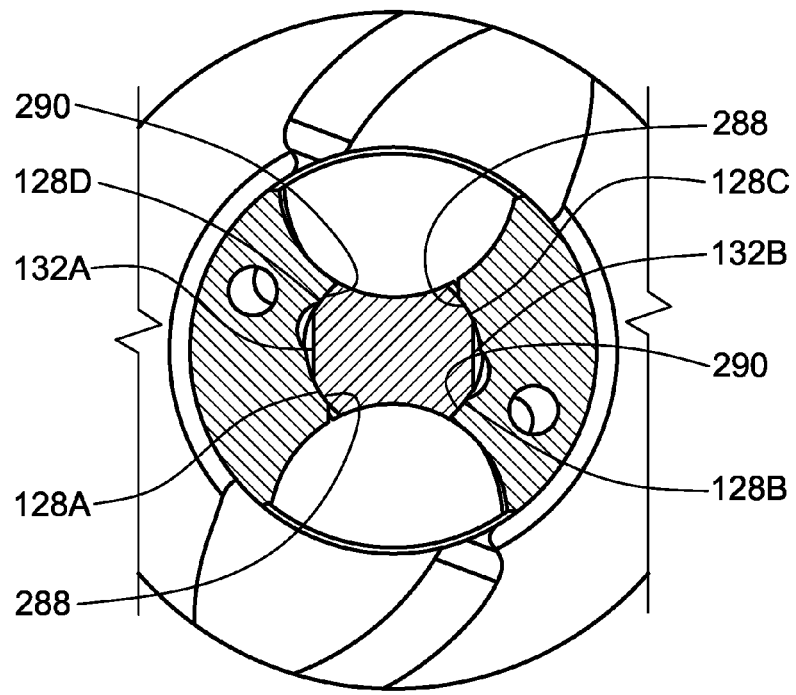
FIG. 11 is a cross-section of the tool seen in FIG. 10 taken along lines XI-XI.

In addition, the fixation portion 120 of the cutting head 100 contacts and displaces the resilient shank coupling portions 256A, 256B in a radially outward direction as the head fixation surfaces and the shank fixation surfaces come into abutment with one another. More particularly, in the fully mounted position, the leading head fixation surfaces 128A, 128C abut the first shank fixation surface 288 formed on each shank coupling portion 256A, 256B, and the trailing head fixation surfaces 128B, 128D abut the second shank fixation surface 288 formed on each shank coupling portion 256A, 256B (as seen in FIG. 11). Because all the head fixation surfaces 128A, 128B, 128C, 128D are generally parallel to the longitudinal axis L of the cutting head 100 and all the shank fixation surfaces 288, 290 are parallel to the longitudinal axis S of the tool shank 200, virtually the entire force exerted by each head fixation surface against its corresponding shank fixation surface is directed in a radially outward direction relative to the longitudinal tool axis X. This contrasts with the angled force applied between the sloped head fixation surfaces and the sloped shank fixation surfaces in the aforementioned U.S. Published Patent Application No. 2005/0260046 A1. And unlike in this prior art reference, when the head fixation surfaces 128A, 128B, 128C, 128D abut the shank fixation surfaces 288, 290, the entire bulge 108 is spaced apart from walls of shank pocket recess 264.

Figure 10:
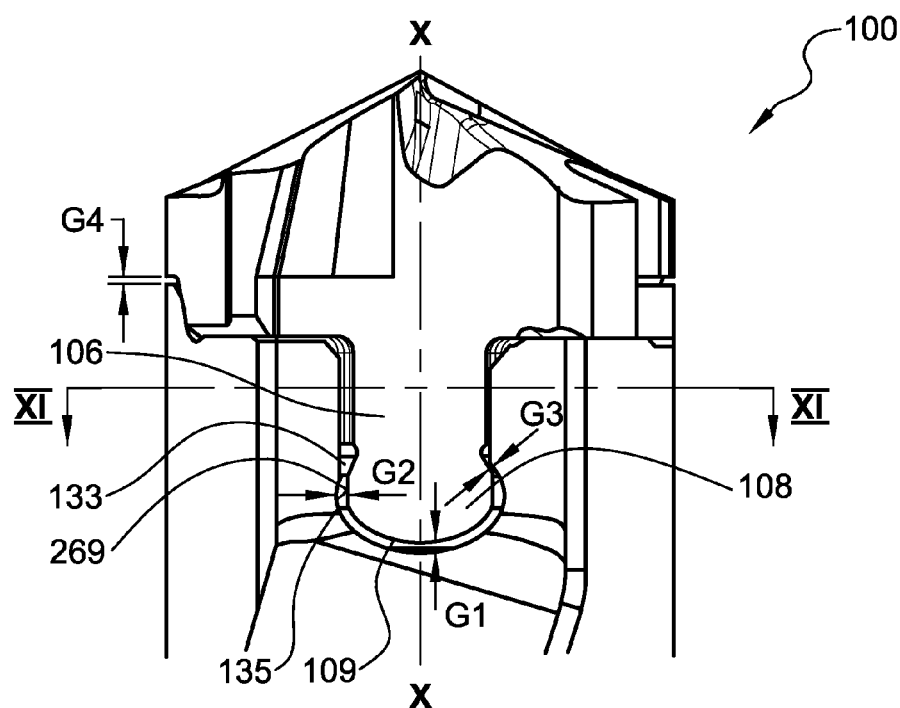
FIG. 10 is a view of the assembled tool including the cutting head of FIG. 2 fully mounted in the tool shank of FIG. 7.

It should be noted, however, that in the fully mounted position, the cutting head's rounded bottom 109 and the rear recess surface 270 are not in abutment so that a gap G1 exists between them (FIG. 10). This space is preferably small so that chips cut from a workpiece will not become lodged in the space. A gap G2 also exits between the radially directed protrusion surface 135 of each protrusion and the recess relief wall 267 formed in the shank pocket recess 264. Furthermore, yet another gap G3 exists between the beveled protrusion surface 133 of each protrusion and the rearwardly facing recess retaining surface 269. As a consequence, in one embodiment, the protrusions are unabutted by surfaces of the shank pocket recess 264, during normal operation of the tool. Preferably, the entire bulge 108 remains unabutted by surfaces of the shank pocket recess 264, including the rearwardly facing recess retaining surface 269, in the fully mounted position and while the drill is being operated.

During a drilling operation, the forwardmost tip of the cutting head 100 enters the workpiece and forms a hole therein. Due to the high heat and cutting forces involved, it often becomes difficult to withdraw the tool from the workpiece. On occasion, as the tool is withdrawn, the cutting head 100 begins to pull out from the frictional grasp of the shank fixation surfaces 288, 290. In such instances, after the cutting head 100 has slightly pulled out, the gap G3 closes as the beveled protrusion surface 133 on the upper surface of the bulge abuts the rearwardly facing recess retaining surface 269, thereby preventing the cutting head 100 from fully pulling out of the shank pocket recess 264. As can be seen in FIG. 10, the pullout prevention property (of the cutting head 100 from shank pocket recess 264) may also be considered as a result of the fact that the bulge 108 has a transverse maximum dimension (perpendicular to the cutting head longitudinal axis L) which is greater than a transverse maximum dimension of the stem 106. This can also be expressed by the relation W3>W2 as shown in FIG. 6. Since the fixation surfaces 128A, 128B, 128C, 128D of the stem 106 abut the shank fixation surfaces 288, 290, the region of the shank fixation recess 286 in which the stem 106 is located also has a transverse maximum dimension (which equals W2) which is smaller than the transverse maximum dimension of the bulge 108, therefore preventing passage of the bulge 108 through the region of the shank fixation recess 286 in which the stem 106 is located. In other words, due to the relatively large dimension of the bulge 108, the cutting head 100 cannot be axially displaced by a distance greater than approximately the dimension of the gap G3. This pullout prevention property holds for all the embodiments described herein.

In the fully mounted position (FIG. 10), the cutting head 100 is retained in a self clamping manner by the tool shank 200. Accordingly, the cutting head 100 can be releasably mounted to the shank 200 without the use of one or more screws. For each of the opposing pairs of head segments 140A, 140B and shank coupling portions 256A, 256B, in addition to the abutment of the head and shank torque transmission walls 152, 282, the first component head base surface 146 and first component shank support surface 276 abut, and the second component head base surface 148 and second component shank support surface 278 abut. However, there is a gap G4 between the protuberance forward surface 284 and the cap recess forward surface 154. Thus, the cutting head 100 is axially supported by the tool shank 200 at four spaced apart axial support regions on the shank support surfaces 262, formed by the abutment of the first and second component head base surfaces 146, 148 with the first and second component shank support surfaces 276, 278; respectively, of each of the opposing pairs of head segments 140A, 140B and shank coupling portions 256A, 256B. With four spaced apart axial support regions the cutting head 100 is stably coupled to the tool shank 200.

Furthermore, each shank support surface 262 is preferably flat and the two component shank support surfaces 276, 278 are preferably coplanar. Similarly, each head base surface 124 is preferably flat and the two component head base surfaces 146, 148 are preferably coplanar. Flat and coplanar axial support surfaces are advantageous over non-coplanar axial support surfaces since it is easier to achieve the required tolerances for coplanar surfaces than it is for non-coplanar surfaces.

One of the advantages of having the entire bulge 108 unabutted by surfaces of the shank pocket recess 264 in the fully mounted position is the ease of manufacture. Since, in the fully mounted position the first component head base surface 146 and first component shank support surface 276 abut, and the second component head base surface 148 and second component shank support surface 278 abut, a requirement of abutment between the bulge 108 and surfaces of the shank pocket recess 264 would necessitate manufacturing the cutting head 100 with very precise axial distances between the bulge 108 and first and second component head base surfaces 146, 148 on the one hand and between the corresponding abutted surfaces of the tool shank 200 on the other hand.

Figure 12:
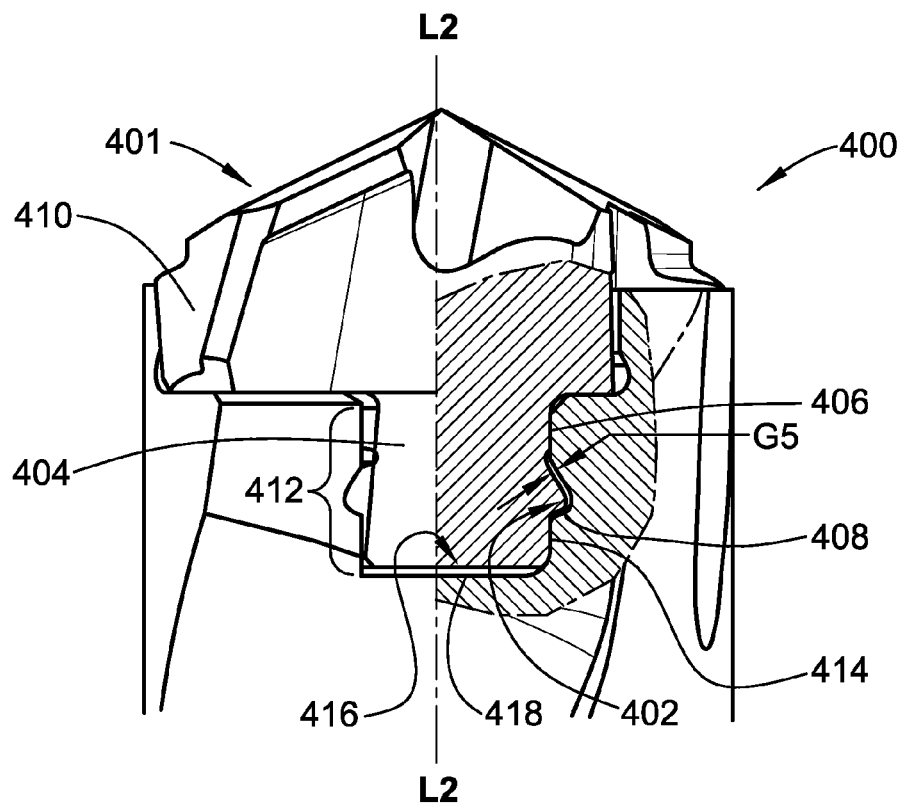
FIG. 12 is a partial cross-sectional view of a tool in accordance with a second embodiment of the present invention.

FIG. 12 shows a partial cross-sectional view of a tool 400 in accordance with a second embodiment of the present invention. The cutting head 401 of tool 400 has a cutting head longitudinal axis L2 and a bulge 402 that is formed on a medial portion of the mounting stem 404. Each of the at least two head fixation surfaces 406 (only one of which is shown) is located between a corresponding protrusion 408 and the cap portion 410. The fixation portion 412 further comprises at least two additional head fixation surfaces 414 (only one of which is shown). The additional head fixation surfaces 414 are located between the protrusions 408 and a lower end 416 of the mounting stem 404. Each of the at least two additional head fixation surfaces is also parallel to the cutting head longitudinal axis L2 and collinear with a corresponding head fixation surface 406 that is located between the protrusions 408 and the cap portion 410. In the tool 400, there is a first gap between the lower end 416 of the mounting stem 404 and the rear recess surface 418, and a second gap G5 also between the protrusion 408 and the clamping portion of the tool shank.

Figure 13:
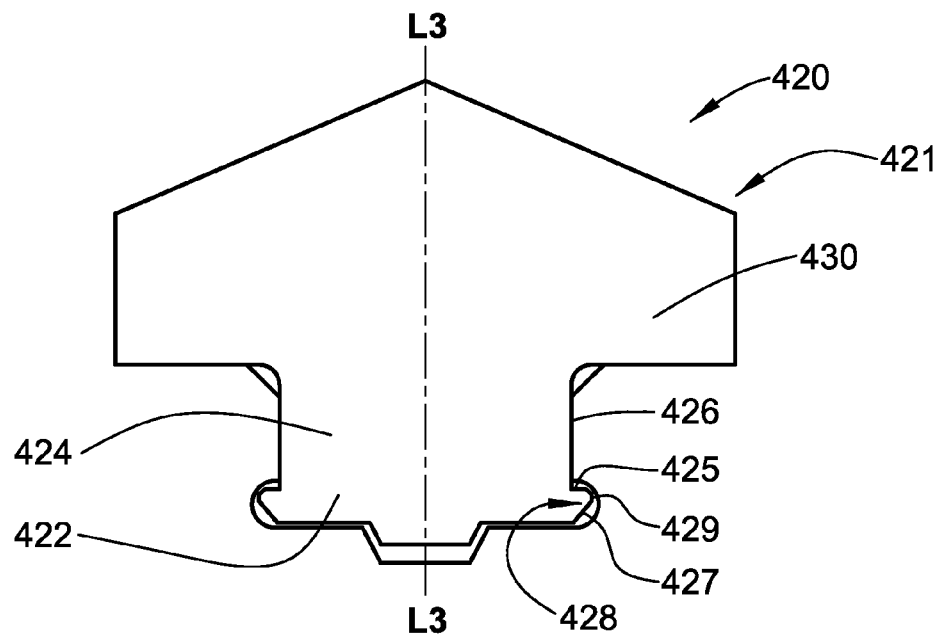
FIG. 13 is a partial cross-sectional view of a cutting head in accordance with a third embodiment of the present invention.

FIG. 13 is a cross-sectional view of a tool 420 in accordance with a third embodiment of the present invention. The cutting head 421 of tool 420 has a cutting head longitudinal axis L3 and a bulge 422 formed on a lower end of the mounting stem 424. Each head fixation surface 426 is located between a corresponding protrusion 428 and the cap portion 430. Each protrusion 428 is provided with a radially outwardly directed protrusion surface 425 which forms the upper surface of the protrusion 428 and extends in a direction perpendicular to the cutting head longitudinal axis L3. Each protrusion 428 is further provided with a beveled protrusion surface 427 which forms the lower surface of the protrusion 428 and connects to the radially outwardly directed protrusion surface 425 at a radially outermost apex 429. The beveled protrusion surface 427 extends from a radially outward position to a radially inward position, in a rearward direction of the cutting head 421.

Figure 14:
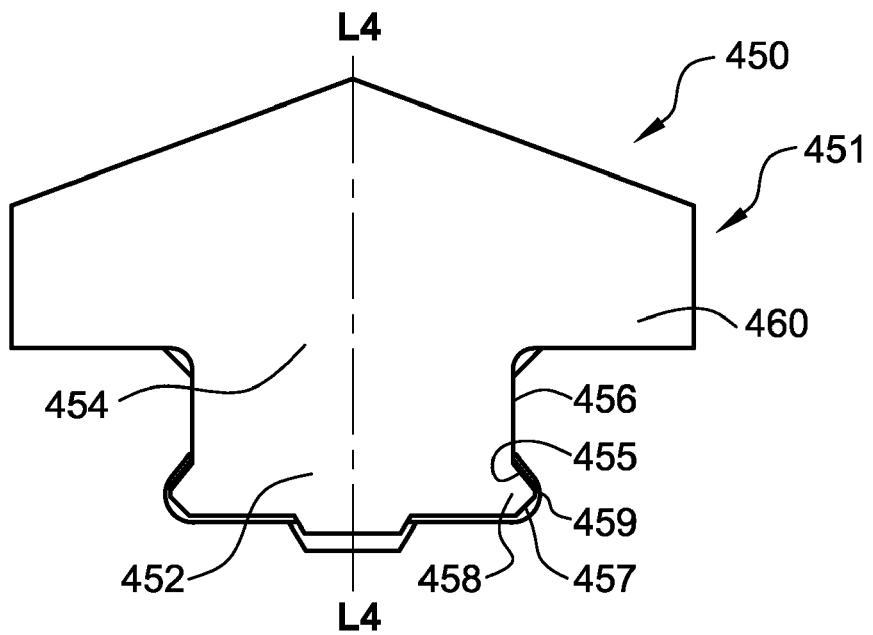
FIG. 14 is a partial cross-sectional view of a cutting head in accordance with a fourth embodiment of the present invention.

FIG. 14 is a cross-sectional view of a tool 450 in accordance with a fourth embodiment of the present invention. The cutting head 451 of tool 450 has a cutting head longitudinal axis L4 and a bulge 452 formed on a lower end of the mounting stem 454. Each head fixation surface 456 is located between a corresponding protrusion 458 and the cap portion 460. Each protrusion 456 is provided with a first beveled protrusion surface 455 that forms the upper surface of the protrusion 458. The first beveled protrusion surface 455 extends from a radially inward position to a radially outward position, in a rearward direction of the cutting head 451. Each protrusion is further provided with a second beveled protrusion surface 457 that forms the lower surface of the protrusion 458 and connects to the first beveled protrusion surface 455 at a radially outermost apex 459. The second beveled protrusion surface 457 extends from a radially outward position to a radially inward position, in a rearward direction of the cutting head 451.

Figure 15:
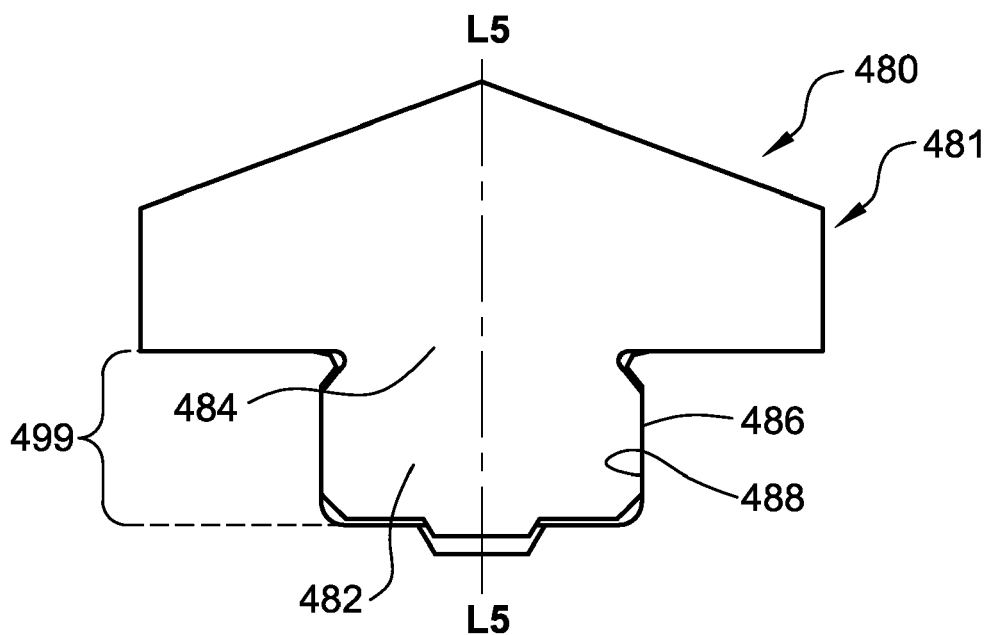
FIG. 15 is a partial cross-sectional view of a cutting head in accordance with a fifth embodiment of the present invention.

FIG. 15 is a cross-sectional view of a tool 480 in accordance with a fifth embodiment of the present invention. The cutting head 481 of tool 480 has a cutting head longitudinal axis L5 and a bulge 482 formed on a lower end of the mounting stem 484. Each head fixation surface 486 is formed on a radially outermost portion of a corresponding protrusion 488. As a consequence, the bulge 488 takes up almost the entire extent of the fixation portion 499.

Figure 16:
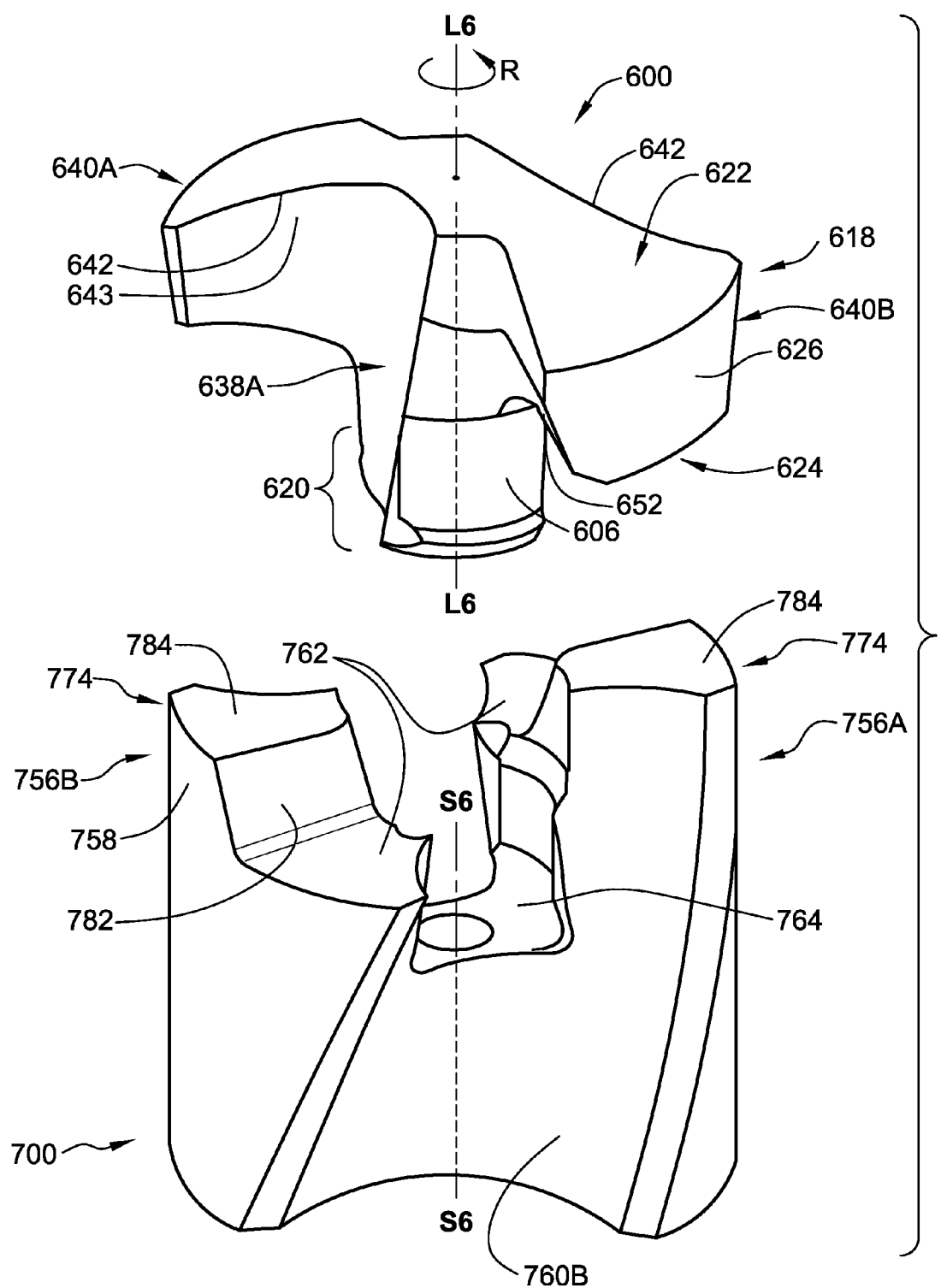
FIG. 16 is a perspective view of a tool comprising a cutting head and shank in accordance with a sixth embodiment of the present invention.
Figure 17:
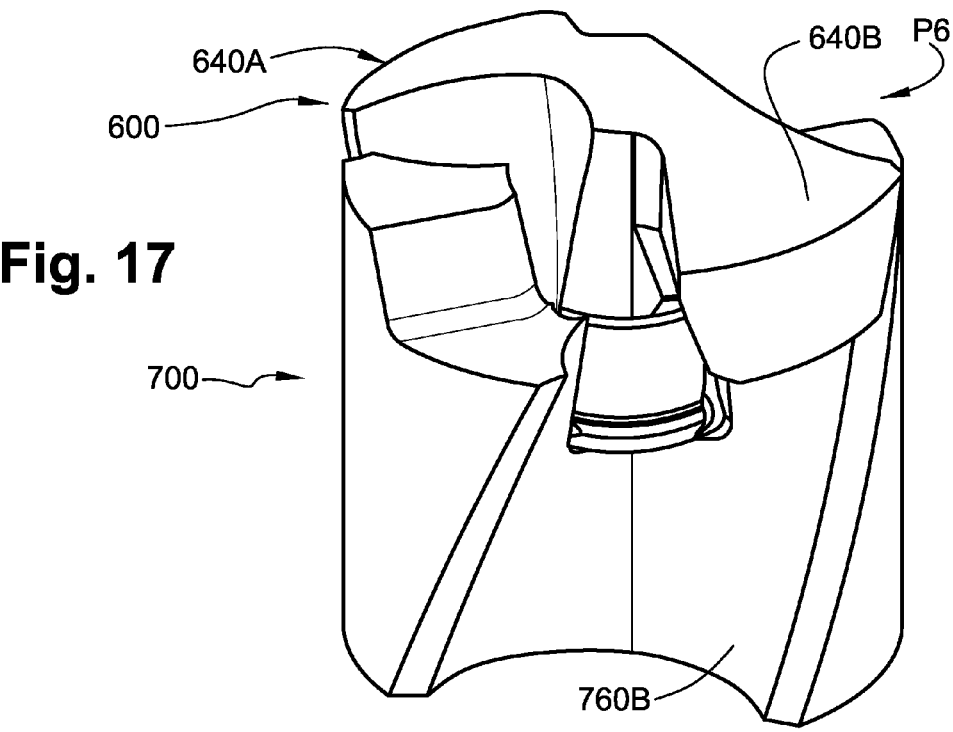
FIG. 17 is a perspective view of the partially assembled tool shown in FIG. 16.
Figure 18:
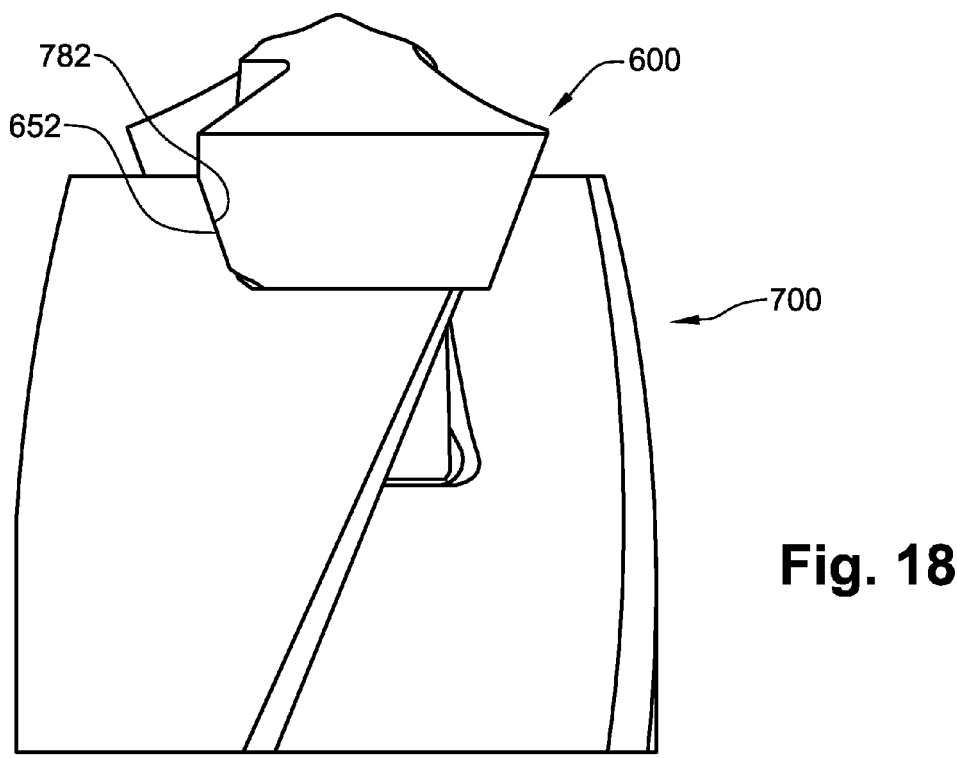
FIG. 18 is a side view of the assembled tool shown in FIG. 16.

A sixth embodiment of the present invention is shown in FIGS. 16-18. A cutting head 600 has a cutting head axis L6, an operative direction of rotation R, and comprises a cap portion 618 and a fixation portion 620. The cap portion 618 comprises a head top surface 622, a head base surface 624 transverse to the cutting head axis L6 and a peripheral side surface 626 extending therebetween. The fixation portion 620 protrudes rearwardly from the head base surface 624 away from the head top surface 622 and is substantially similar to the fixation portion 620 described above and comprises a mounting stem 606 similar to the mounting stem 106 described above. In other embodiments, the fixation portion 620 may be substantially similar to either of the fixation portions 412, 499 described above.

Two head flutes 638A, 638B (not shown) extend generally axially rearwardly along a periphery of the cap portion 618 and fixation portion 620, forming two identical head segments 640A, 640B therebetween. Each head segment 640A, 640B comprises a cutting edge 642 formed along an intersection of an adjacent rake surface 643 with the head surface 622. A head torque transmission wall 652 extends generally transverse to the head base surface 624 and generally faces opposite the cutting head direction of rotation R.

Some embodiments may have a head coolant channel (not shown) similar to the head coolant channel 150 described above.

A tool shank 700 with a shank longitudinal axis S6 is also shown in FIGS. 16 to 18. At a forward end thereof, the tool shank 700 has two diametrically disposed shank coupling portions 756A, 756B each peripherally bound by a shank peripheral surface 758 and two shank flutes 760A, 760B. Each shank coupling portion 756A, 756B has a forwardly facing shank support surface 762 extending from the shank peripheral surface 758 generally transversely inwardly to a shank pocket recess 764 formed between the shank coupling portions 756A, 756B. The shank pocket recess 764 is substantially similar to the shank pocket recess 264 described above.

A protuberance 774 protrudes forwardly from each shank support surface 762 at a trailing end of each shank coupling portion 756A, 756B. In some embodiments there may be a depression formed in each shank support surface 262 at a leading end of the protuberance 774.

In some embodiments, the shank has two shank coolant channels similar to the shank coolant channels 280 described above.

A shank torque transmission wall 782 extends along a portion of the protuberance 774 and is transverse to the shank support surface 762 and generally faces the direction of rotation. A protuberance forward surface 784 merges with the shank torque transmission wall 782, optionally via a similar to the beveled transition surface 283 described above, and is generally parallel to the shank support surface 762.

With reference to FIGS. 17-18, in order to mount the cutting head 600 on the tool shank 700, the cutting head 600 and tool shank 700 are axially aligned so that the cutting head segments 640A, 640B and shank flutes 760A, 760B are arranged in opposing pairs.

The cutting head 600 and tool shank 700 are then urged towards each other so that the shank pocket recess 764 receives the fixation portion 620.

Finally, the cutting head 600 is brought into a fully mounted position by rotating it in the direction indicated by rotational arrow P6 relative to the tool shank 700 until the head and shank torque transmission walls (652, 782 respectively) abut.

According to some embodiments, the head fixation surfaces of the mounting stem of the fixation portion of the cutting head comprise a portion of either an elliptical or a circular cross section while each of the fixation surfaces of the shank coupling portions comprises a portion of either a circular or an elliptical cross section respectively.

Figure 19A:
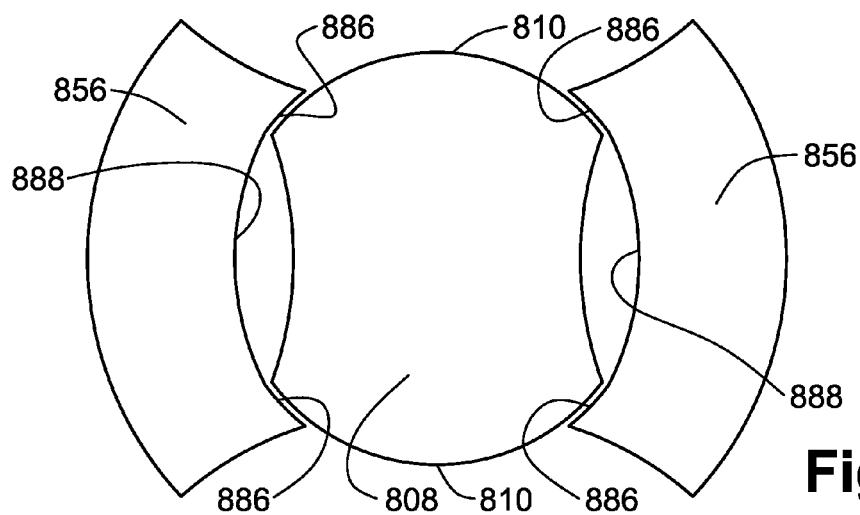
FIG. 19A is a schematic cross section of the tool shown in FIG. 1 wherein a fixation portion of a cutting head is inserted into tool shank.
Figure 19B:
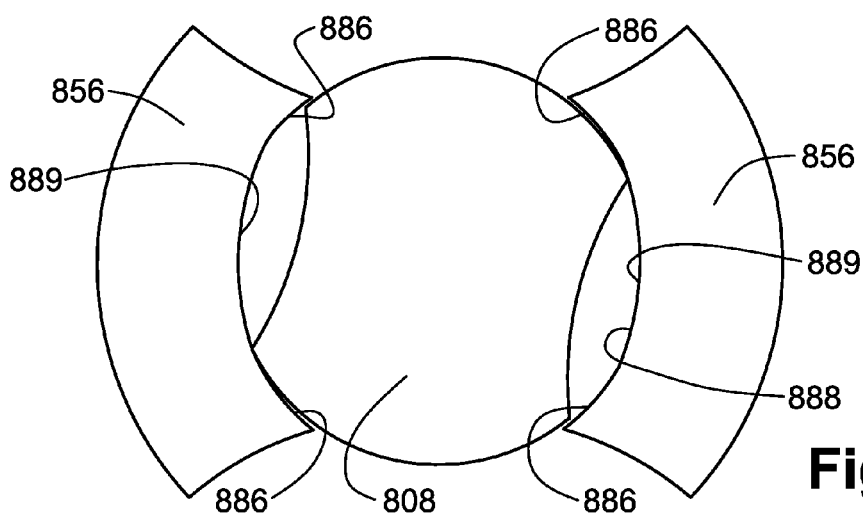
FIG. 19B is a schematic cross section of the tool shown in FIG. 19A wherein the fixation portion of the cutting head is partially mounted in the tool shank.
Figure 19C:
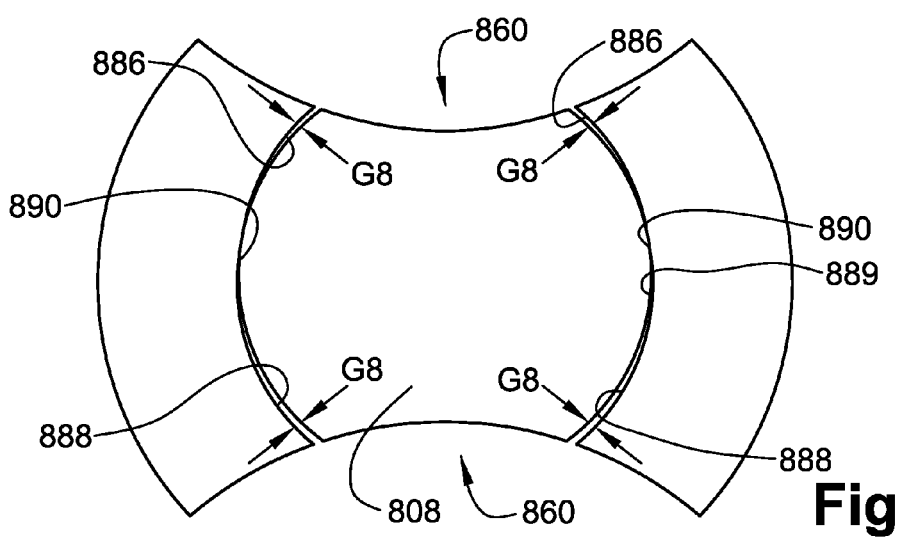
FIG. 19C is a schematic cross section of the tool shown in FIG. 19A wherein the fixation portion of the cutting head is mounted in the tool shank.

According to some embodiments, as shown in FIGS. 19A-19C, end portions 886 of the shank fixation surfaces 888 of the shank coupling portions 856 adjacent the shank flutes 860 are chamfered, so that initial contact between the head fixation surfaces 810 of the mounting stem 808 and the shank fixation surfaces 888 is not at the end portions 886 of the shank fixation surfaces 888 but rather closer to a central portion 889 of each shank fixation surface 888. In a fully mounted position, abutment between the shank fixation surfaces 888 and the head fixation surfaces 810 is over an abutting region 890 of the fixation surface 888 which extends from the central portion 889 of each shank fixation surface 888 to the vicinity of the chamfered end portions 886, but excluding the chamfered end portions 886, so that leading and trailing gaps G8 are formed between the head fixation surfaces 810 and the shank fixation surfaces 888 adjacent the shank flutes 860. Such an arrangement is advantageous since if initial contact between the head fixation surfaces 810 of the mounting stem 808 and the shank fixation surfaces 888 was to take place at the end portions 886 of the shank fixation surfaces 888, the latter could be damaged, since the mounting stem 808 may be made of a hard metal, such as tungsten carbide, whereas the shank coupling portions 856 may be made of steel.

In the embodiments described with respect to FIGS. 1-11, the cutting head 100 is shown to have two head flutes 138A, 138B which form two cutting head segments 140A, 140B therebetween. And the shank 200 is shown to have two shank flutes 260A, 260B which connect with the head flutes 138A, 138B in the assembled tool, and two shank coupling portions 256A, 256B which mate with the underside of the two cutting head segments 104. Furthermore, associated with each cutting head segment 140A, 140B are two head fixation surfaces 128A, 128B or 128B, 128C, respectively; and associated with the inner surface of each shank cutting portion 256A, 256B are two shank fixation surfaces 288, 290.

It should be understood, however, that in other embodiments the number of flutes/cutting head segments/shank coupling portions may be some other number, such as 1, 3, 4 or even more. Similarly, in other embodiments, the number of head fixation surfaces/shank fixation surfaces associated with each cutting head segment/shank coupling portion, may also be some other number. For example, when the cutting head is an insert for a gun drill, only a single flute, cutting head, and shank coupling portion may be provided. And in tools having shanks and cutting heads with large cross-sectional diameters, three or more flutes, cutting heads and shank coupling portions may be required.

Although the present invention has been described to a certain degree of particularity, it should be understood that various alterations and modifications could be made without departing from the scope of the invention as hereinafter claimed.

What is claimed is:

1. A metal cutting head having a cutting head longitudinal axis (L) defining forward and rearward directions, the metal cutting head comprising:
    a cap portion comprising a plurality of head segments separated by at least first and second head flutes, each head segment comprising a rearwardly facing head base surface formed at a rearward end of the cap portion; and
    a fixation portion joined to the cap portion and extending in a rearward direction of the cutting head, the fixation portion comprising:
        a mounting stem connected to the cap portion;
        a bulge formed on the mounting stem, the bulge comprising a plurality of circumferentially spaced apart protrusions, the protrusions defining a maximum dimension of the fixation portion in a direction perpendicular to the cutting head longitudinal axis; and
        a plurality of spaced apart head fixation surfaces formed along the fixation portion, each head fixation surface being parallel to the cutting head longitudinal axis.

2. The metal cutting head according to claim 1, wherein:
    at least four spaced apart head fixation surfaces are formed on the mounting stem;
    a first pair of protrusions is located on opposites sides of the first head flute; and
    a second pair of protrusions is located on opposite sides of the second head flute.

3. The metal cutting head according to claim 2, wherein:
    a first pair of head fixation surfaces is separated by the first head flute;
    a second pair of head fixation surfaces is separated by the second head flute; and
    adjacent head fixation surfaces that are between the first and second head flutes are separated by a head fixation recess formed in the mounting stem.

4. The metal cutting head according to claim 1, wherein:
each head fixation surface has an arcuate shape in a cross-section taken perpendicular to the cutting head longitudinal axis.

5. The metal cutting head according to claim 1, wherein:
the bulge is formed on a medial portion of the mounting stem;
each of said head fixation surfaces is located between a corresponding protrusion and the cap portion; and
the fixation portion further comprises a plurality of additional head fixation surfaces, the additional head fixation surfaces being located between the protrusions and a lower end of the mounting stem, each of said additional head fixation surfaces being parallel to the cutting head longitudinal axis and collinear with a corresponding head fixation surface of the plurality of head fixation surfaces located between the protrusions and the cap portion.

6. The metal cutting head according to claim 1, wherein:
the bulge is formed on a lower end of the mounting stem;
each head fixation surface is located between a corresponding protrusion and the cap portion;
each protrusion is provided with a radially outwardly directed protrusion surface that is formed on an upper surface of the protrusion and extends in a direction perpendicular to the cutting head longitudinal axis;
each protrusion is further provided with a beveled protrusion surface which forms a lower surface of the protrusion, connects to the radially outwardly directed protrusion surface at a radially outermost apex, and extends from a radially outward position to a radially inward position, in a rearward direction of the cutting head.

7. The metal cutting head according to claim 1, wherein:
the bulge is formed on a lower end of the mounting stem;
each head fixation surface is located between a corresponding protrusion and the cap portion;
each protrusion is provided with a first beveled protrusion surface which forms an upper surface of the protrusion, and extends from a radially inward position to a radially outward position, in a rearward direction of the cutting head; and
each protrusion is further provided with a second beveled protrusion surface which forms a lower surface of the protrusion, connects to the first beveled protrusion surface at a radially outermost apex, and extends from a radially outward position to a radially inward position, in a rearward direction of the cutting head.

8. The metal cutting head according to claim 1, wherein:
each head fixation surface is formed on a radially outermost portion of a corresponding protrusion.

9. A metal cutting tool comprising:
a metal cutting head releasably mounted on a forward end of a tool shank, the metal cutting head and the tool shank having a common axis of rotation and a common direction of rotation, wherein:
the metal cutting head comprises:
   a cutting head longitudinal axis (L) which is coincident with the common axis of rotation;
   a cap portion comprising a plurality of head segments separated by at least first and second head flutes, each head segment comprising a rearwardly facing head base surface formed at a rearward end of the cap portion; and
   a fixation portion joined to the cap portion and extending in a rearward direction of the cutting head, the fixation portion comprising:
      a mounting stem connected to the cap portion;
      a bulge formed on the mounting stem, the bulge comprising a plurality of circumferentially spaced apart protrusions, the protrusions defining a maximum dimension of the fixation portion in a direction perpendicular to the cutting head longitudinal axis; and
      a plurality of spaced apart head fixation surfaces formed along the fixation portion, each head fixation surface being parallel to the cutting head longitudinal axis; and
the tool shank comprises:
   a shank longitudinal axis (S) which is coincident with the common axis of rotation;
   a plurality of shank coupling portions, equal in number to the plurality of head segments, formed at the forward end of the tool shank, and a shank pocket recess formed between the shank coupling portions, each shank coupling portion including:
      a forwardly facing shank support surface; and
      an inner surface comprising a plurality shank fixation surfaces, each shank fixation surface being parallel to the shank longitudinal axis;
wherein:
the rearwardly facing head base surface of each head segment is supported by the forwardly facing shank support surface of a corresponding shank coupling portion;
each head fixation surface abuts an opposing shank fixation surface over an abutment region; and
the entire bulge is spaced apart from walls of shank pocket recess.

10. The metal cutting tool according to claim 9, wherein:
at least four spaced apart head fixation surfaces are formed on the mounting stem;
the inner surface of each shank coupling portion comprises:
   a leading shank fixation surface and a trailing shank fixation surface, the leading and trailing shank fixation surfaces being parallel to the shank longitudinal axis and being separated by a shank fixation recess;
each head fixation surface abuts a shank fixation surface;
a first pair of protrusions is located on opposites sides of the first head flute; and
a second pair of protrusions is located on opposite sides of the second head flute.

11. The metal cutting tool according to claim 9, wherein:
the tool shank further comprises:
   a protuberance protruding forwardly from each shank support surface, the protuberance having a protuberance forward surface; and
   a shank torque transmission wall extending along a portion of the protuberance transverse to the shank support surface and generally facing the direction of rotation;
the cutting head further comprises:
   at least one circumferentially facing head torque transmission wall extending generally transversely to the head base surface and generally facing opposite the direction of rotation;
the shank torque transmission wall abuts the head torque transmission wall.

12. The metal cutting tool according to claim 11, wherein:
the protuberance forward surface is generally parallel to the shank support surface.

13. The metal cutting tool according to claim 11, further comprising:
at least one shank coolant channel opening out to at least one of the shank support surfaces.

14. The metal cutting tool according to claim 9, wherein:
the bulge is formed on a lower end of the mounting stem; and
each head fixation surface is located between a corresponding protrusion and the cap portion.

15. The metal cutting tool according to claim 9, wherein:
the tool shank further comprises at least first and second shank flutes and wherein the head flutes and the shank flutes are generally aligned and wherein adjacent the shank flutes there is a gap between the head and shank fixation surfaces of opposing pairs of head and shank fixation surfaces.

16. A method for assembling a metal cutting tool comprising a cutting head having a cap portion and a fixation portion provided with a bulge, and a tool shank having a pair of shank coupling portions defining a shank pocket recess therebetween, the method comprising:
axially aligning the cutting head and the tool shank so that cutting head segments and shank flutes are arranged in opposing pairs;
urging the cutting head and the tool shank towards each other so that the shank pocket recess receives the fixation portion; and
rotating the cutting head relative to the tool shank until:
a plurality of head fixation surfaces which are parallel to a longitudinal axis of the cutting head abut a corresponding number of shank fixation surfaces which are parallel to a longitudinal axis of the shank, such that the entire bulge is spaced apart from walls of shank pocket recess; and
a head torque transmission wall abuts a shank torque transmission wall.

17. A metal cutting head having a cutting head longitudinal axis (L) defining forward and rearward directions, the metal cutting head comprising:
a cap portion comprising at least one head segment, said at least one head segment comprising a rearwardly facing head base surface formed at a rearward end of the cap portion; and
a fixation portion joined to the cap portion and extending in a rearward direction of the cutting head, the fixation portion comprising:
a mounting stem connected to the cap portion;
a bulge formed on the mounting stem, the bulge comprising at least one circumferentially extending protrusion defining a maximum dimension of the fixation portion in a direction perpendicular to the cutting head longitudinal axis; and
a plurality of spaced apart head fixation surfaces formed along the fixation portion, each head fixation surface being parallel to the cutting head longitudinal axis.

18. A metal cutting tool comprising:
a metal cutting head releasably mounted on a forward end of a tool shank, the metal cutting head and the tool shank having a common axis of rotation and a common direction of rotation, wherein:
the metal cutting head comprises:
a cutting head longitudinal axis (L) which is coincident with the common axis of rotation;
at least two head fixation surfaces that comprise a portion of a circular cross section that is perpendicular to the longitudinal axis (L); and
the tool shank comprises:
a shank longitudinal axis (S) which is coincident with the common axis of rotation;
at least two shank fixation surfaces, that comprise a portion of an elliptical cross section that is perpendicular to the shank longitudinal axis (S).

19. The metal cutting tool according to claim 18, wherein:
the metal cutting head further comprises at least two head flutes;
the tool shank further comprises at least two shank flutes;
in a fully mounted position, the head flutes and the shank flutes are generally aligned and adjacent the shank flutes there is a gap between the head and shank fixation surfaces of opposing pairs of head and shank fixation surfaces.

* * * * *